US010841891B2

(12) United States Patent
Rahman et al.

(10) Patent No.: US 10,841,891 B2
(45) Date of Patent: Nov. 17, 2020

(54) METHOD AND APPARATUS FOR EFFICIENTLY DELIVERING SUPPLEMENTARY SERVICES TO MULTI-TECHNOLOGY CAPABLE WIRELESS TRANSMIT/RECEIVE UNITS

(71) Applicant: InterDigital Technology Corporation, Wilmington, DE (US)

(72) Inventors: Shamim A. Rahman, Cote St. Luc (CA); Kamel M. Shaheen, Camas, WA (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 16/505,119

(22) Filed: Jul. 8, 2019

(65) Prior Publication Data
US 2019/0335412 A1  Oct. 31, 2019

Related U.S. Application Data

(63) Continuation of application No. 16/208,126, filed on Dec. 3, 2018, now Pat. No. 10,349,369, which is a
(Continued)

(51) Int. Cl.
*H04W 4/00* (2018.01)
*H04W 60/00* (2009.01)
(Continued)

(52) U.S. Cl.
CPC ........... *H04W 60/00* (2013.01); *H04M 7/006* (2013.01); *H04W 4/12* (2013.01); *H04W 4/16* (2013.01);
(Continued)

(58) Field of Classification Search
USPC ......... 455/435.1, 90.2; 379/114.12; 709/226, 709/228; 370/338, 328
See application file for complete search history.

(56) References Cited

U.S. PATENT DOCUMENTS 5,412,375 A  5/1995 Wood
6,006,091 A  12/1999 Lupien
(Continued)

FOREIGN PATENT DOCUMENTS

EM  1 372 309  12/2003
EP  1 051 054  11/2000
(Continued)

OTHER PUBLICATIONS

Ala-Laurila et al. "Wireless LAN Access Network Architecture for Mobile Operators", IEEE Communications Magazine, pp. 82-89, Nov. 2001.
(Continued)

*Primary Examiner* — David Q Nguyen
(74) *Attorney, Agent, or Firm* — Volpe Koenig

(57) ABSTRACT

A method for operation by a wireless device may comprise transmitting a request for capability information to a WTRU. In response, the wireless device may receive the requested capability information from the WTRU. The capability information may include an indication of support for video conferencing and an indication of one or more supported messaging capabilities. Based on the supported messaging capabilities, the wireless device may transmit a data message to the WTRU.

20 Claims, 4 Drawing Sheets

Related U.S. Application Data continuation of application No. 14/807,173, filed on Jul. 23, 2015, now Pat. No. 10,149,264, which is a continuation of application No. 14/014,905, filed on Aug. 30, 2013, now Pat. No. 9,094,930, which is a continuation of application No. 10/880,696, filed on Jun. 30, 2004, now Pat. No. 8,526,978.

(60) Provisional application No. 60/515,479, filed on Oct. 29, 2003.

(51) Int. Cl.
| | | |
|---|---|---|
| *H04M 7/00* | (2006.01) | |
| *H04W 4/12* | (2009.01) | |
| *H04W 8/22* | (2009.01) | |
| *H04W 80/00* | (2009.01) | |
| *H04W 88/06* | (2009.01) | |
| *H04W 4/16* | (2009.01) | |
| H04W 80/04 | (2009.01) | |
| H04W 84/12 | (2009.01) | |

(52) U.S. Cl.
CPC .............. *H04W 8/22* (2013.01); *H04W 80/00* (2013.01); *H04W 88/06* (2013.01); *H04W 80/04* (2013.01); *H04W 84/12* (2013.01)

(56) References Cited

U.S. PATENT DOCUMENTS

| | | | |
|---|---|---|---|
| 6,064,889 A | 5/2000 | Fehnel | |
| 6,163,546 A | 12/2000 | Sipila | |
| 6,243,581 B1 | 6/2001 | Jawanda | |
| 6,477,372 B1 | 11/2002 | Otting et al. | |
| 6,678,524 B1 | 1/2004 | Hansson et al. | |
| 6,763,226 B1* | 7/2004 | McZeal, Jr. ........ | H04B 7/18595 455/90.2 |
| 6,859,649 B1 | 2/2005 | Denenberg et al. | |
| 6,931,249 B2 | 8/2005 | Fors et al. | |
| 6,970,452 B2 | 11/2005 | Kim et al. | |
| 7,130,638 B2 | 10/2006 | Chen et al. | |
| 7,180,860 B2 | 2/2007 | Fonden et al. | |
| 7,184,418 B1 | 2/2007 | Baba et al. | |
| 7,221,929 B2 | 5/2007 | Lee et al. | |
| 7,441,043 B1 | 10/2008 | Henry et al. | |
| 7,664,495 B1 | 2/2010 | Bonner et al. | |
| 8,023,941 B2 | 9/2011 | Shaheen et al. | |
| 2002/0044634 A1 | 4/2002 | Rooke et al. | |
| 2002/0044643 A1 | 4/2002 | Lee | |
| 2002/0054579 A1* | 5/2002 | Miloslavsky ........... | H04L 29/06 370/328 |
| 2002/0085516 A1 | 7/2002 | Bridgelall | |
| 2002/0133600 A1* | 9/2002 | Williams .............. | H04M 15/57 709/228 |
| 2002/0147008 A1 | 10/2002 | Kallio | |
| 2002/0165966 A1* | 11/2002 | Widegren ......... | H04M 15/8016 709/226 |
| 2002/0191575 A1 | 12/2002 | Kalavade et al. | |
| 2003/0039234 A1 | 2/2003 | Sharma et al. | |
| 2003/0051041 A1 | 3/2003 | Kalavade et al. | |
| 2003/0054818 A1 | 3/2003 | Bahl et al. | |
| 2003/0101246 A1 | 5/2003 | Lahti | |
| 2003/0104816 A1 | 6/2003 | Duplessis et al. | |
| 2003/0134636 A1 | 7/2003 | Sundar et al. | |
| 2003/0134650 A1 | 7/2003 | Sundar et al. | |
| 2003/0139180 A1 | 7/2003 | McIntosh et al. | |
| 2003/0176195 A1 | 9/2003 | Dick et al. | |
| 2003/0233461 A1 | 12/2003 | Mariblanca-Nieves et al. | |
| 2004/0066769 A1* | 4/2004 | Ahmavaara ......... | H04L 12/2856 370/338 |
| 2004/0105434 A1 | 6/2004 | Baw | |
| 2004/0114553 A1 | 6/2004 | Jiang et al. | |
| 2004/0132427 A1 | 7/2004 | Lee et al. | |
| 2004/0176024 A1 | 9/2004 | Hsu et al. | |
| 2005/0002407 A1 | 1/2005 | Shaheen et al. | |
| 2005/0009517 A1 | 1/2005 | Maes | |
| 2005/0038876 A1 | 2/2005 | Chaudhuri | |
| 2005/0083899 A1 | 4/2005 | Babbar et al. | |
| 2006/0056607 A1* | 3/2006 | Halkosaari ............ | H04M 15/07 379/114.12 |
| 2006/0223497 A1 | 10/2006 | Gallagher et al. | |
| 2007/0112948 A1 | 5/2007 | Uhlik | |
| 2007/0238448 A1 | 10/2007 | Gallagher et al. | |
| 2016/0205150 A1* | 7/2016 | Shaheen ............... | H04W 92/02 370/328 |

FOREIGN PATENT DOCUMENTS

| | | |
|---|---|---|
| EP | 1 089 580 | 4/2001 |
| EP | 1 213 941 | 6/2002 |
| WO | 99/48312 | 9/1999 |
| WO | 00/54536 | 9/2000 |
| WO | 01/08434 | 2/2001 |
| WO | 01/084765 | 11/2001 |
| WO | 01/093607 | 12/2001 |
| WO | 02/062094 | 8/2002 |
| WO | 03/081557 | 10/2003 |
| WO | 04/034720 | 4/2004 |
| WO | 05/046106 | 5/2005 |
| WO | 05/048577 | 5/2005 |

OTHER PUBLICATIONS

Interdigital Communication, "WLAN capability IE in MS Network Capability," 3GPP TSG-CN1 Meeting #32, N1-031498 (Oct. 2003).
Mouly et al., "The GSM System for Mobile Communications," XP002194765, pp. 366-384 (Jan. 1992).
Nokia, "UMTS-Wireless LAN Interworking," 3GPP TSG SA1#14, S1-011018 (Nov. 5, 2001).
Third Generation Partnership Project, "Technical Specification Group Radio Access Network; Radio Resource Control (RRC); Protocol Specification (Release 5)," 3GPP TS 25.331 V5.6.0 (Sep. 2003).
Third Generation Partnership Project, "Technical Specification Group Radio Access Network; Radio Resource Control (RRC); Protocol Specification (Release 5)," 3GPP TS 25.331 V5.8.0 (Mar. 2004).
Third Generation Partnership Project, "Technical Specification Group Radio Access Network; Radio Resource Control (RRC); Protocol Specification (Release 1999)," 3GPP TS 25.331 V3.16.0 (Sep. 2003).
Third Generation Partnership Project, "Technical Specification Group Radio Access Network; Radio Resource Control (RRC); Protocol Specification (Release 1999)," 3GPP TS 25.331 V3.19.0 (Jun. 2004).
Third Generation Partnership Project, "Technical Specification Group Radio Access Network; Radio Resource Control (RRC); Protocol Specification (Release 4)," 3GPP TS 25.331 V4.11.0 (Sep. 2003).
Third Generation Partnership Project, "Technical Specification Group Radio Access Network; Radio Resource Control (RRC); Protocol Specification (Release 4)," 3GPP TS 25.331 V4.14.0 (Jun. 2004).
Third Generation Partnership Project, "Technical Specification Group Services and System Aspects; IP Multimedia Subsystem (IMS); Stage 2 (Release 5)," 3GPP TS 23.228 V5.10.0 (Mar. 2003).
Third Generation Partnership Project, "Technical Specification Group Services and System Aspects; IP Multimedia Subsystem (IMS); Stage 2 (Release 5)," 3GPP TS 23.228 V5.12.0 (Mar. 2004).
Third Generation Partnership Project, "Technical Specification Group Services and System Aspects; 3GPP system to Wireless Local Area Network (WLAN) Interworking; System Description (Release 6)," 3GPP TS 23.234 V2.0.0 (Sep. 2003).
Third Generation Partnership Project, "Technical Specification Group Services and System Aspects; 3GPP system to Wireless Local Area Network (WLAN) Interworking; System Description (Release 6)," 3GPP TS 23.234 V6.1.0 (Jun. 2004).
Third Generation Partnership Project, "Technical Specification Group Core Network; Signalling flows for the IP multimedia call control based on SIP and SDP; Stage 3 (Release 5)," 3GPP TS 24.228 V5.9.0 (Jun. 2004).

(56) References Cited

OTHER PUBLICATIONS

Third Generation Partnership Project, "Technical Specification Group Core Network; Signalling flows for the IP multimedia call control based on SIP and SDP; Stage 3 (Release 5)," 3GPP TS 24.228 V5.6.0 (Sep. 2003).

Third Generation Partnership Project, "Technical Specification Group Core Network; IP Multimedia Call Control Protocol based on Session Initiation Protocol (SIP) and Session Description Protocol (SDP); Stage 3 (Release 5)," 3GPP TS 24.229 V5.6.0 (Sep. 2003).

Third Generation Partnership Project, "Technical Specification Group Core Network; IP Multimedia Call Control Protocol based on Session Initiation Protocol (SIP) and Session Description Protocol (SDP); Stage 3 (Release 5)," 3GPP TS 24.229 V5.9.0 (Jun. 2004).

Third Generation Partnership Project, "Technical Specification Group Core Network; IP Multimedia Call Control Protocol based on Session Initiation Protocol (SIP) and Session Description Protocol (SDP); Stage 3 (Release 6)," 3GPP TS 24.229 V6.0.0 (Sep. 2003).

Third Generation Partnership Project, "Technical Specification Group Core Network; IP Multimedia Call Control Protocol based on Session Initiation Protocol (SIP) and Session Description Protocol (SDP); Stage 3 (Release 5)," 3GPP TS 24.229 V6.3.0 (Jun. 2004).

Third Generation Partnership Project, "Technical Specification Group Core Network; Mobile radio interface layer 3 specification; Core Network Protocols; Stage 3 (Release 1999)," 3GPP TS 24.008 V3.17.0 (Sep. 2003).

Third Generation Partnership Project, "Technical Specification Group Core Network; Mobile radio interface layer 3 specification; Core Network Protocols; Stage 3 (Release 1999)," 3GPP TS 24.008 V3.19.0 (Jun. 2004).

Third Generation Partnership Project, "Technical Specification Group Core Network; Mobile radio interface Layer 3 specification; Core network protocols; Stage 3 (Release 4)," 3GPP TS 24.008 V4.12.0 (Sep. 2003).

Third Generation Partnership Project, "Technical Specification Group Core Network; Mobile radio interface Layer 3 specification; Core network protocols; Stage 3 (Release 4)," 3GPP TS 24.008 V4.14.0 (Jun. 2004).

Third Generation Partnership Project, "Technical Specification Group Core Network; Mobile radio interface Layer 3 specification; Core network protocols; Stage 3 (Release 5)," 3GPP TS 24.008 V5.9.0 (Sep. 2003).

Third Generation Partnership Project, "Technical Specification Group Core Network; Mobile radio interface Layer 3 specification; Core network protocols; Stage 3 (Release 5)," 3GPP TS 24.008 V5.12.0 (Jun. 2004).

Third Generation Partnership Project, "Technical Specification Group Core Network; Mobile radio interface Layer 3 specification; Core network protocols; Stage 3 (Release 6)," 3GPP TS 24.008 V6.2.0 (Sep. 2003).

Third Generation Partnership Project, "Technical Specification Group Core Network; Mobile radio interface Layer 3 specification; Core network protocols; Stage 3 (Release 6)," 3GPP TS 24.008 V6.5.0 (Jun. 2004).

Third Generation Partnership Project, "Technical Specification Group Core Network; 3GPP System to WLAN Interworking; UE to Network protocols; Stage 3 (Release 6)," 3GPP TS 24.234 V0.1.0 (Aug. 2003).

Third Generation Partnership Project, "Technical Specification Group Core Network; 3GPP System to WLAN Interworking; UE to Network protocols; Stage 3 (Release 6)," 3GPP TS 24.234 V1.4.1 (May 2004).

Universal Mobile Telecommunications System (UMTS); Feasibility study on 3GPP system to Wireless Local Area Network (WLAN) interworking (3GPP TR 22.934 version 6.2.0 Release 6), ETSI TR 122 934 V6.2.0 (Sep. 2003).

\* cited by examiner

METHOD AND APPARATUS FOR EFFICIENTLY DELIVERING SUPPLEMENTARY SERVICES TO MULTI-TECHNOLOGY CAPABLE WIRELESS TRANSMIT/RECEIVE UNITS

CROSS REFERENCE TO RELATED APPLICATIONS

This application is a continuation of U.S. patent application Ser. No. 16/208,126, filed on Dec. 3, 2018, which is a continuation of U.S. patent application Ser. No. 14/807,173, filed on Jul. 23, 2015, which is a continuation of U.S. patent application Ser. No. 14/014,905, filed on Aug. 30, 2013, which was issued on Jul. 28, 2015 as U.S. Pat. No. 9,094,930, which is a continuation of U.S. patent application Ser. No. 10/880,696, filed on Jun. 30, 2004, which issued on Sep. 3, 2013 as U.S. Pat. No. 8,526,978, which claims the benefit of U.S. Provisional Application No. 60/515,479 filed on Oct. 29, 2003, which are incorporated by reference as if fully set forth herein.

FIELD OF INVENTION

The present invention relates to wireless communication systems. More particularly, the present invention relates to delivery of services to multi-technology capable wireless transmit/receive units.

BACKGROUND

Although the meanings of the following acronyms are well understood by skilled artisans, the following list is deemed to assist in a better understanding of the invention:
  3GPP third generation partnership project
  AAA authentication, authorization, and accounting
  AP access point
  CCF charging control function
  CSCF call state control function
  EIR equipment identity register
  GGSN gateway GPRS support node
  GMSC gateway MSC
  GPRS general packet radio system
  GSM global system for mobile communication
  HLR home location register
  HSS home subscriber server
  IP internet protocol
  IWMSC interworking MSC for SMS
  MMS multi-media services
  MS mobile station
  MSC mobile switching station
  PDG packet data gateway
  PHY physical layer
  PDA personal digital assistant
  SC service center
  SIM subscriber identity module
  SMS short messaging service
  TCP transmission control protocol
  UMTS universal mobile telecommunications system
  VoIP voice over internet protocol
  WAG wireless application gateway
  WAT wireless access technology
  WLAN wireless local area network
  WTRU wireless transmit/receive unit The trend in the wireless industry is to increasingly support wireless transmit/receive units (WTRUs) that support multiple Wireless Access Technologies (WATs) in heterogeneous networks. Network interworking introduces the possibility of several WATs (e.g., several different types of wireless local area networks) such 802.11a, 802.11b, 802.11g, etc. being connected to a cellular type network (e.g., a Universal Mobile Telecommunications System (UMTS) network). Further, using subscriber identity module (SIM) technology, users may switch their 802.11b card to an 802.11a card, for example, or any other type of multi-mode card using their SIM to access the network while the network is not totally aware of the WAT supported at the WTRU level. Additionally, users may use their 802.11 cards, for example, in different types of WTRUs, such as when they obtain a new laptop or personal digital assistant (PDA), for example.

In light of the above, it is desirable to efficiently handle various types of wireless services across multiple WATs for WTRUs that may operate in cellular and WLAN type networks.

SUMMARY

A method and system for efficiently handling various types of wireless services across multiple wireless access technologies is disclosed for WTRUs that may operate in different types of networks.

A method for operation by a wireless device may comprise transmitting a request for capability information to a WTRU. In response, the wireless device may receive the requested capability information from the WTRU. The capability information may include an indication of support for video conferencing and an indication of one or more supported messaging capabilities. Based on the supported messaging capabilities, the wireless device may transmit a data message to the WTRU.

DETAILED DESCRIPTION

Hereafter, a WTRU includes, but is not limited to, a user equipment, mobile station, fixed or mobile subscriber unit, pager, PDA or any other type of device capable of operating in a wireless environment. When referred to hereafter, a base station includes but is not limited to a Node B, site controller, access point (AP) or any other type of interfacing device in a wireless environment.

Figure 1:
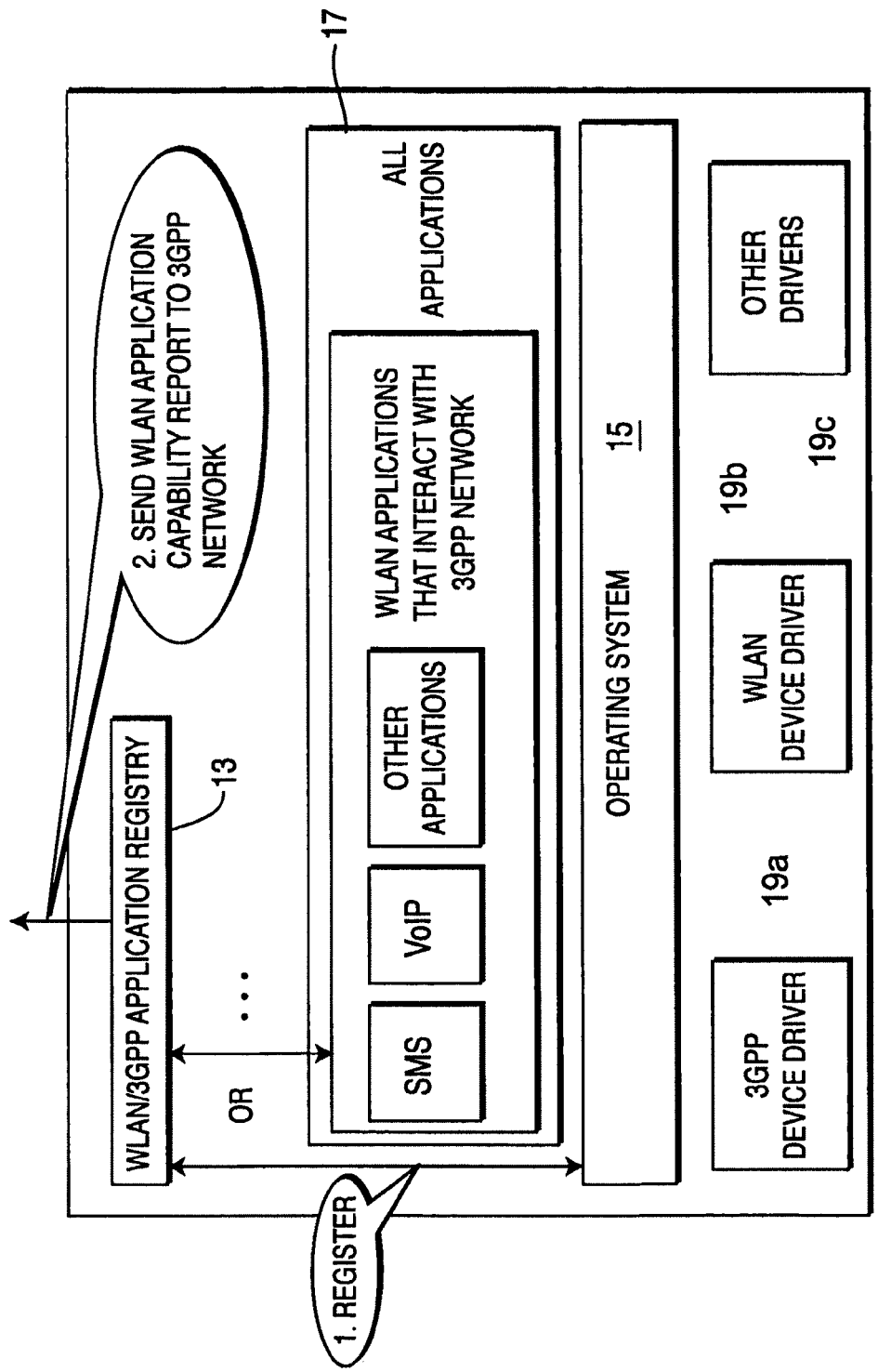
FIG. 1 is a WTRU logical block diagram embodying the principles of an embodiment of the present invention.

FIG. 1 is a simplified logical block diagram of the layers provided in a WTRU 12, it being understood that a similar layered structure is provided in the network. The objective is to convey the capabilities of the WTRU to the network so that the network can tailor the services provided to the WTRU in accordance with the WTRU's capabilities. As an example, devices such as a PDA, a laptop equipped with a wireless communication card and a cell phone may all be capable of communicating with a WLAN, but each device has different capabilities. A laptop typically has a larger memory and greater processing power than both a PDA and a cell phone. Different laptops may have different capabilities; one laptop being able to conduct video conferencing while another laptop being unable to support such services.

Figure 2:
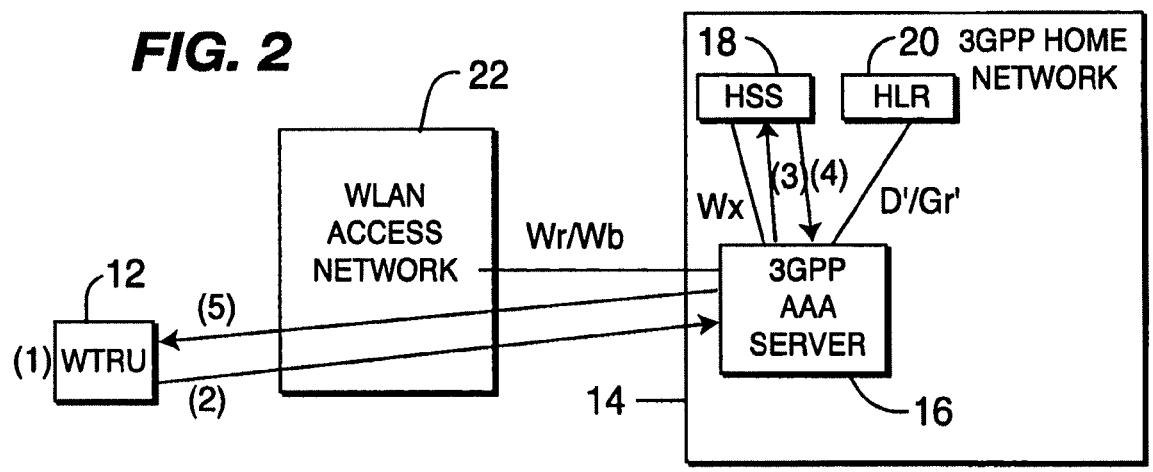
FIG. 2 is a block diagram of steps involved in performing a registration-based operation wherein a capability report is provided in accordance with an embodiment of the present invention.

Referring to FIG. 2, a process for WTRU registration that includes the generation and transmittal of a capability report as shown, by combining notification of services supported by the WTRU with a registration process, the network is then able to tailor the services provided to the WTRU communicating with the network. Each time a multi-WATs WTRU, also referred to as a multi-technology WTRU (i.e., a WTRU capable of operating in more than one type of wireless network), successfully registers for service with an authentication, authorization and accounting (AAA) server 16 of a 3GPP network 14 through WLAN access network 22, a WLAN application capability report is sent to the 3GPP network 14 and preferably to the home subscriber server (HSS) 18.

With reference to FIG. 1, initially, the WTRU operating system 15, at step (1), directs the registry application 13 to register the WTRU with the network, for example, the WTRU registers with the 3GPP network through a WLAN. At step (2), the registry application generates and sends a capability report based on either information from the operating system 15 or applications module 17 of the WTRU to include WLAN applications that interact with the 3GPP network, such as short message service (SMS) and voice over IP (VoIP), as well as any other currently supported applications. Drivers, such as a 3GPP driver 19a and WLAN device driver 19b, as well as other drivers 19c, support the services obtained from the network. The layers 13, 17, 15 and associated drivers are also provided in the network to support registry, receipt and storage of the capability report and, subsequent thereto, to provide the services identified in the capability report obtained from the WTRU.

The WLAN capability report is preferably a list of all supported air interface (PHY) capabilities currently supported by the WTRU 12 (e.g., 802.11a, 802.11b, 802.11x, 802.16, 802.20, UMTS-FDD, UMTS-TDD, TDSCDMA, GPRS, CDMA2000, or any other type of wireless network).

The WLAN capability report preferably also includes a list of all supported applications/services currently supported by the WTRU (e.g., web browsing, email, SMS, VoIP, or any other type of wireless service). The list of supported services can be associated with certain PHY capabilities (e.g., 802.11b card with MMS service capabilities). The list may also indicate third generation (3G) interworking such as 3GPP and/or 3GPP2 (e.g., GPRS/802.11 dual-mode cards supporting GPRS based SMS services) and/or other services developed in the future for existing or future networks. Optionally, the lists can identify the type and capacity of equipment of the WTRU, i.e. whether the WTRU is a cell phone, lap top computer, etc. with memory and processing speed capacities. The information regarding the device capability may be stored in the device drivers illustrated in FIG. 1.

The SMS message is preferably sent from a 3GPP network to a WTRU on an 802.11 network that is displayed to a user. The lists described above are preferably standardized.

The WLAN capability report is generated by a "thin" application program for generating the capability report. The "thin" application program can be on top of the operating system (e.g., like a Windows® program) and, being "thin," does not require thousands of lines of code, but requires only several hundred lines of code. For example, the "thin" program is provided in the WLAN/3GPP application registry (AR) 13 in the WTRU 12 shown in FIG. 1, wherein the network registry queries the WTRU's operating system 15 or the applications module 17, to determine the list of relevant applications.

As illustrated in FIG. 2, the capability report is preferably sent encrypted from the end user WTRU (currently on a WLAN) through WLAN access network 22 to the 3GPP AAA server 16, which forwards the report to the 3GPP HSS/HLR 18/20. The report is preferably sent encrypted via transmission control protocol/internet protocol (TCP/IP) from the WTRU 12 on the WLAN to the 3GPP AAA server 16, at step (2), and the 3GPP AAA server 16 then preferably forwards the report to the HSS 18 as part of the WLAN registration process, at step (3). The HSS/HLR 18/20 sends an acknowledgement (ACK) to the AAA 16, at step (4) which sends an ACK to WTRU 12 through WLAN network 22, at step (5).

Thereafter, whenever the HSS/HLR 18/20 is queried for the location and capability of the user, a relevant check is made to determine if the user's WTRU supports that capability in the WLAN network.

Referring to the top portion of FIG. 2, WLAN access network 22 communicates with 3GPP AAA server 16 through a Wr/Wb interface. HSS 18 and HLR 20 communicate with 3GPP AAA server 16 through interfaces Wx and D'/Gr', respectively.

As indicated in parentheses in FIG. 2, the system components and steps involved in performing a registration based operation are preferably:

1. WTRU 12 generates WLAN application capability report.
2. WTRU 12 transmits report via WLAN 22 to 3GPP AAA 16.
3. 3GPP AAA 16 forwards report to HSS/HLR 18/20.
4. HSS/HLR 18/20 acknowledges the report to AAA 16.
5. 3GPP 14 acknowledges the report to the WTRU 12 via WLAN 22.

Thereafter, any 3GPP node that attempts to deliver service to the WTRU in the WLAN network will check if the WTRU supports the service in WLAN mode.

Figure 2A:
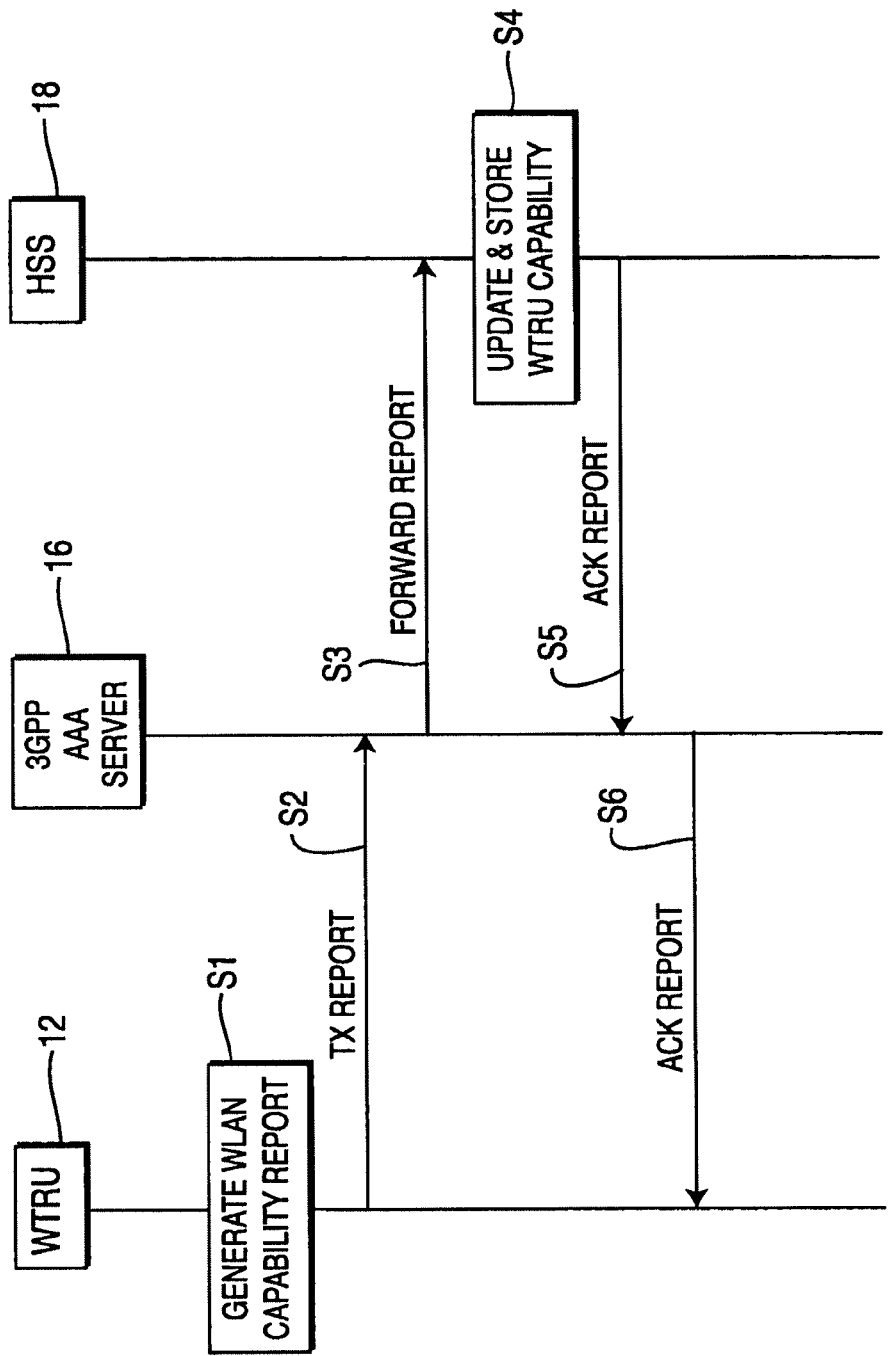
FIG. 2A is a timeline illustration of the procedure illustrated in FIG. 2.

The timing of these steps is shown and described in greater detail in FIG. 2A, wherein a capability report is created at step S1, the WTRU 12 generating a WLAN application capability report and, at step S2, transmitting the report to the 3GPP AAA server 16 through WLAN 22 (shown in FIG. 2). The 3GPP AAA 16, at step S3, forwards the report to HSS 18 and HSS 18, at step S4, stores the report and, at step S5, acknowledges the report, sending an acknowledgement (ACK) to AAA 16. AAA Server 16, at step S6, sends an ACK to WTRU 12 through WLAN access network 22. Then, any 3GPP node that delivers service to the WTRU 12 in the WLAN network can first determine if the WTRU supports the service when operating in WLAN mode, by accessing HSS 18.

Figure 3:
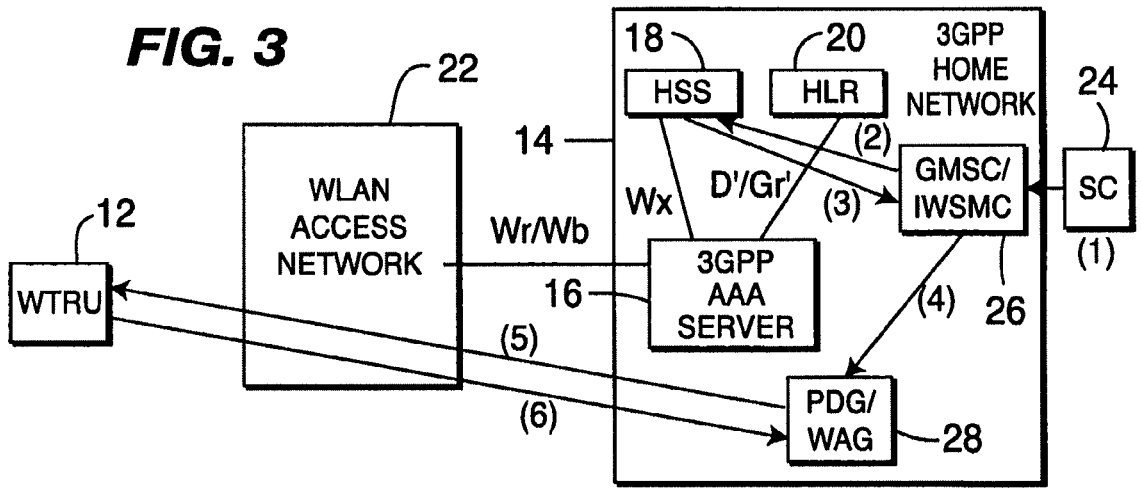
FIG. 3 is a block diagram of steps involved in performing a network-solicited operation wherein a capability report is provided in accordance with an embodiment of the present invention.

Referring now to FIG. 3, the system components are the same as those shown in FIG. 2. The preferred steps involved in performing a network-solicited capability operation, as indicated in parentheses in FIG. 3, can be summarized as follows:

1. SMS message is sent from SC 24.
2. GMSC 26 queries HSS 18 about WTRU 12 location.
3. HSS 18 returns PDG/WAG 28 address.
4. GMSC 26 forwards SMS to PDG/WAG 28.

5. PDG/WAG 28 queries the WTRU 12 via WLAN 22 about SMS capabilities.

6. WTRU 12 lists all service capabilities and reports to PDG/WAG 28.

If successful, PDG/WAG 28 delivers SMS to WTRU 12 through WLAN 22.

Figure 3A:
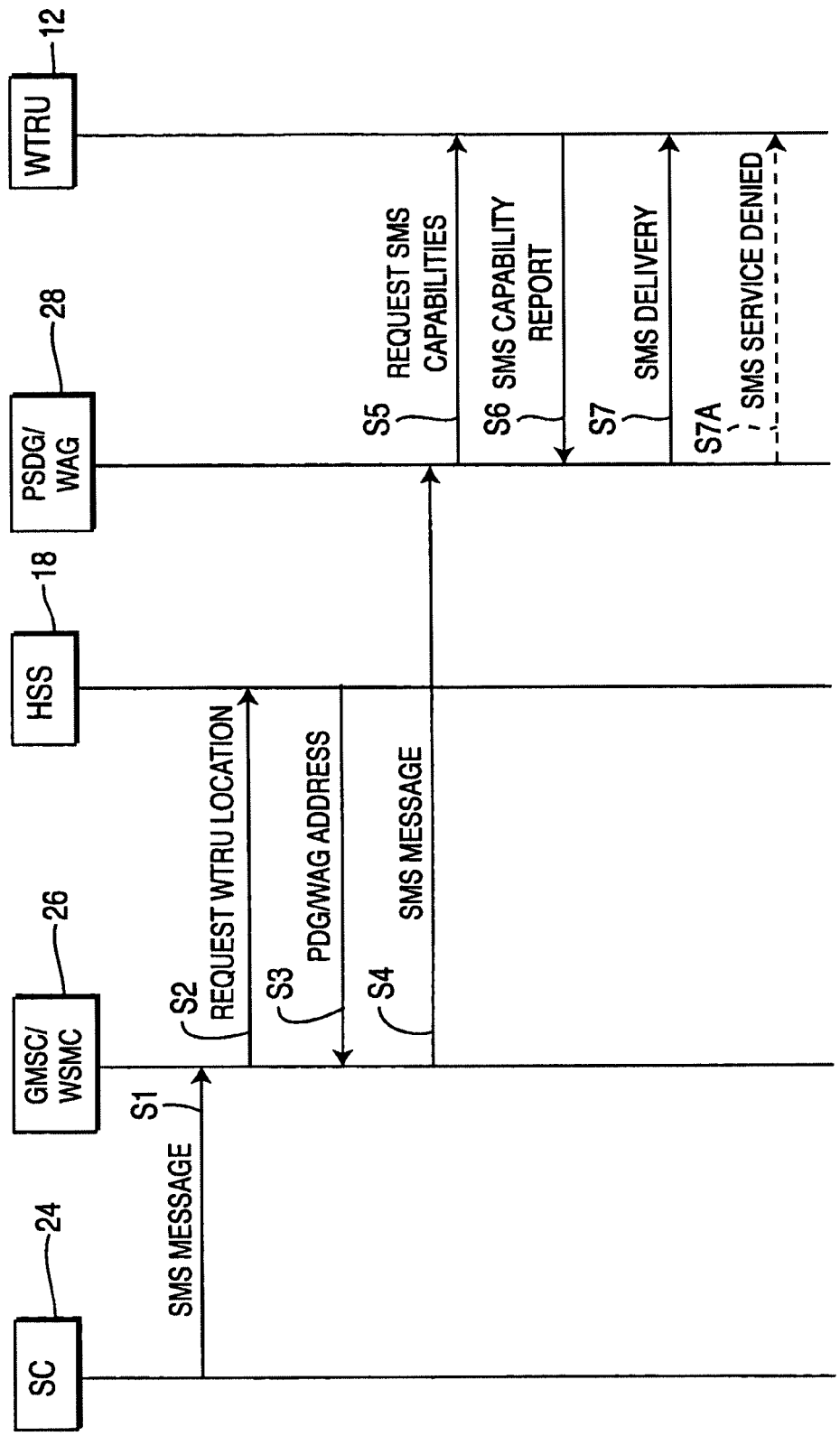
FIG. 3A is a timeline illustration of the procedure illustrated in FIG. 3.

Timing of these steps is shown in FIG. 3A wherein a capability report has not previously been provided. In this embodiment, a short message system (SMS) message is sent from service center (SC) 24 to a gateway Mobile Switching Center (MSC) or an interworking MSC for SMS (GMSC/IWSMC) 26, at step S1, and responsive thereto, GMSC/IWSMC 26, at step S2, queries HSS 18 about the WTRU location. The HSS 18, at step (3), provides a packet data gateway or a wireless application gateway (PDG/WAG) address to the GMSC/IWSMC 26 and the GMSC/IWSMC 26, at step S4, forwards the SMS message to the PDG/WAG 28. The PDG/WAG 28, at step S5, queries the WTRU 12 (through WLAN access network 22 shown in FIG. 3) about its SMS capabilities and WTRU 12, at step S6, and through WLAN access network 22, lists all service capabilities and provides a report to the PDG/WAG 28. Then, if successful, the PDG/WAG 28, at step S7, delivers SMS to WTRU 12. If not successful, the PDG/WAG 28 denies service, at step S7A.

It should be noted that although the present invention has been described in connection with an interworking 3GPP and WLAN, it is important to note that the present invention may be implemented in all types of wireless communication systems and further in any combination.

What is claimed is:

1. A wireless device configured for operation in a cellular network, the wireless device comprising:
    a transmitter configured to transmit a request for capability information to a wireless transmit/receive unit (WTRU);
    a receiver configured to receive capability information in response to the request, from the WTRU, wherein the capability information includes an indication of support for video conferencing and an indication of one or more supported messaging capabilities; and
    the transmitter configured to transmit a data message to the WTRU, wherein the data message is formatted in accordance with a service for which the capability information indicates support for;
    wherein the capability information is received before the data message is transmitted and the data message is a first in time data message, of the service, sent by the wireless device to the WTRU.

2. The wireless device of claim 1, wherein the wireless device is a device of a cellular core network.

3. The wireless device of claim 1, wherein the wireless device is a gateway.

4. The wireless device of claim 1, wherein the capability information indicates a location querying capability.

5. The wireless device of claim 1 wherein the WTRU supports multiple wireless access technologies including at least a wireless local area network (WLAN) technology and a cellular technology.

6. The wireless device of claim 1, wherein the capability information indicates support for an 802.11x WLAN technology.

7. The wireless device of claim 1, wherein the WTRU supports messaging via an application program which runs on top of an operating system of the WTRU.

8. A method for operation by a wireless device, the method comprising:
    transmitting a request for capability information to a wireless transmit/receive unit (WTRU);
    receiving the capability information in response to the request, from the WTRU, in a capability report, wherein the capability information of the capability report includes an indication of support for video conferencing and an indication of one or more supported messaging capabilities;
    transmitting a data message to the WTRU, after receiving the capability information, wherein the data message is formatted in accordance with the capability information.

9. The method of claim 8, wherein the wireless device is a device of a cellular core network.

10. The method of claim 8, wherein the wireless device is a gateway.

11. The method of claim 8, wherein the capability information of the capability report indicates a location querying cap ability.

12. The method of claim 8, wherein the WTRU supports multiple wireless access technologies including at least a wireless local area network (WLAN) technology and a cellular technology.

13. The method of claim 8, wherein the capability information of the capability report indicates support for an 802.11x WLAN technology.

14. The method of claim 8, wherein the WTRU supports messaging via an application program which runs on top of an operating system of the WTRU.

15. A method for operation by a wireless device, the method comprising:
    receiving capability information from a wireless transmit/receive unit (WTRU), wherein the capability information includes an indication of support for video conferencing and an indication of one or more supported messaging capabilities;
    transmitting a data message to the WTRU, wherein the data message is formatted in accordance with the capability information, wherein the capability information is received before the data message is transmitted; and
    determining, from the capability information, that the WTRU in incapable of participating in at least one service.

16. The method of claim 15, wherein the wireless device is a device of a cellular core network.

17. The method of claim 15, wherein the wireless device is a gateway.

18. The method of claim 15, wherein the capability information indicates a location querying capability.

19. The method of claim 15, wherein the WTRU supports multiple wireless access technologies including at least a wireless local area network (WLAN) technology and a cellular technology.

20. The method of claim 15, wherein the WTRU supports messaging via an application program which runs on top of an operating system of the WTRU.

\* \* \* \* \*